United States Patent
Barnes et al.

(10) Patent No.: US 9,004,466 B2
(45) Date of Patent: Apr. 14, 2015

(54) PNEUMATICALLY AUGMENTED ELASTOMERIC DAMPER FOR IMPROVED SPRING RATE TUNING

(71) Applicant: Bell Helicopter Textron Inc., Fort Worth, TX (US)

(72) Inventors: Brian E. Barnes, Bedford, TX (US); Frank B. Stamps, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 13/758,488

(22) Filed: Feb. 4, 2013

(65) Prior Publication Data

US 2014/0217659 A1    Aug. 7, 2014

(51) Int. Cl.
| | | |
|---|---|---|
| F16F 5/00 | (2006.01) | |
| F16F 7/00 | (2006.01) | |
| F16F 13/26 | (2006.01) | |
| B64C 27/00 | (2006.01) | |
| F16F 13/06 | (2006.01) | |

(52) U.S. Cl.
CPC ............ *F16F 13/26* (2013.01); *B64C 27/001* (2013.01); *F16F 13/06* (2013.01); *B64C 2027/003* (2013.01)

(58) Field of Classification Search
USPC ............. 267/140.11–140.14, 141–141.2, 35, 267/152, 219, 220
See application file for complete search history.

(56) References Cited

U.S. PATENT DOCUMENTS

| | | | | |
|---|---|---|---|---|
| 4,084,668 | A * | 4/1978 | Rybicki | 188/312 |
| 4,895,354 | A * | 1/1990 | Byrnes | 267/141.1 |
| 5,477,947 | A * | 12/1995 | Schalles et al. | 188/298 |
| 5,501,434 | A * | 3/1996 | McGuire | 267/140.11 |
| 6,082,968 | A * | 7/2000 | Nyhus | 416/148 |
| 6,092,795 | A * | 7/2000 | McGuire | 267/140.11 |
| 6,213,261 | B1 * | 4/2001 | Kunkel | 188/314 |
| 7,314,124 | B2 * | 1/2008 | Martyn et al. | 188/318 |
| 7,413,062 | B2 * | 8/2008 | Vandewal | 188/266.5 |
| 2003/0042661 | A1 | 3/2003 | Popjay | |
| 2012/0256055 | A1 | 10/2012 | Jolly et al. | |

FOREIGN PATENT DOCUMENTS

| | | |
|---|---|---|
| EP | 1659309 | 11/2005 |
| GB | 581797 | 9/1944 |

OTHER PUBLICATIONS

European Search Report dated Feb. 7, 2013 from counterpart EP App. No. 13163188.9.
European Office Action for related European Application No. 13163188.9-1754, dated Oct. 10, 2013.
Office Action dated Jan. 26, 2015 from counterpart CA App. No. 2,841,413.

* cited by examiner

*Primary Examiner* — Vishal Sahni
(74) *Attorney, Agent, or Firm* — James E. Walton

(57) ABSTRACT

A system and method to change a spring rate of a damper in real time. The damper includes a housing having an inner surface that forms a cavity. An elastomeric material is disposed within the cavity and fixedly attached to the inner surface of the housing. A first chamber is formed by a first end of the elastomeric material and the inner surface of the housing. The method includes restricting movement of the elastomeric material by regulating the pressure within the first chamber, which in turn changes the spring rate of the damper.

9 Claims, 4 Drawing Sheets

PNEUMATICALLY AUGMENTED ELASTOMERIC DAMPER FOR IMPROVED SPRING RATE TUNING

BACKGROUND

1. Field of the Invention

The present application relates generally to dampers, and more specifically, to adjustable aircraft dampers.

2. Description of Related Art

Dampers are well known in the aircraft industry for effectively compensating for undesired forces during flight. In some embodiments, an aircraft utilizes a plurality of dampers for a rotor system, wherein undesired forces created by the rotor blades are dampened, resulting in optimal flight conditions.

A common problem associated with conventional dampers is the inability to selectively change the damper spring rate during flight. For example, an aircraft damper is subject to temperature changes as the aircraft increases elevation, which in turn affects the elastic properties of the elastomeric material disposed within the damper, resulting in different spring rates during flight. These undesired features greatly reduce the damper efficiency, thus potentially harming the flight characteristics of the aircraft during flight.

Although significant developments in dampers have been made, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
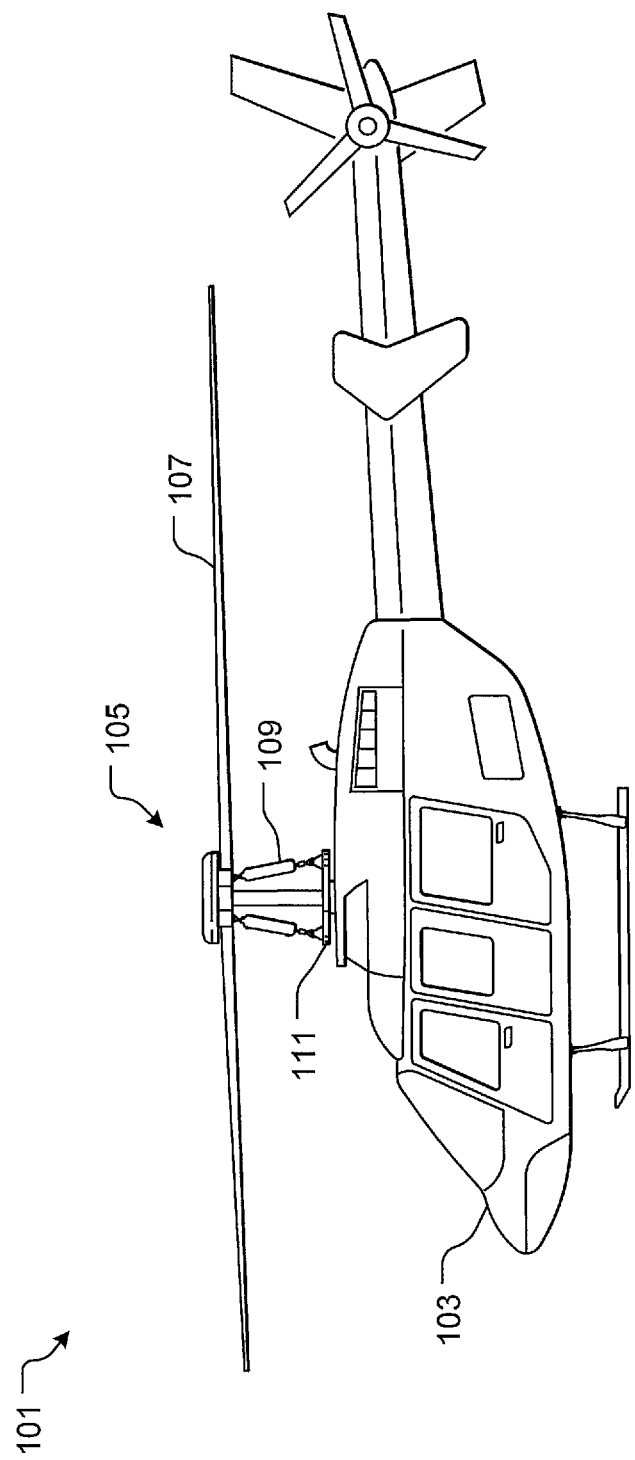
FIG. 1 is a side view of an aircraft according to the preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The damper system and method of the present application overcome the above-listed problems commonly associated with conventional dampers. Specifically, the damper system is provided with an adjustable damper, wherein depending on desired flight conditions, the damper system adjusts the damper spring rate such that optimal flight conditions are achieved. The damper system is capable of achieving such results by regulating, either via gas or fluid, at least one chamber disposed within the damper and operably associated with the elastomeric material therein. Further detailed description of these features is provided below and illustrated in the accompanying drawings.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Referring now to the drawings wherein like reference characters identify corresponding or similar elements throughout the several views, FIG. 1 depicts an aircraft 101 in accordance with a preferred embodiment of the present application. In the exemplary embodiment, aircraft 101 is a helicopter having a fuselage 103 and a rotor system 105 carried thereon. A plurality of rotor blades 107 is operably associated with rotor system 105 for creating flight.

As depicted, one or more damper systems 109 are operably associated with rotor system 105, for example a rotor swashplate 111 or other devices of the rotor system. In the contemplated embodiment, damper system 109 is configured to dampen forces created by the rotor system 105 during flight; however, it will be appreciated that damper system 109 could also be utilized with different devices of the aircraft or vehicles that utilize dampers in accordance with the present application.

Figure 2:
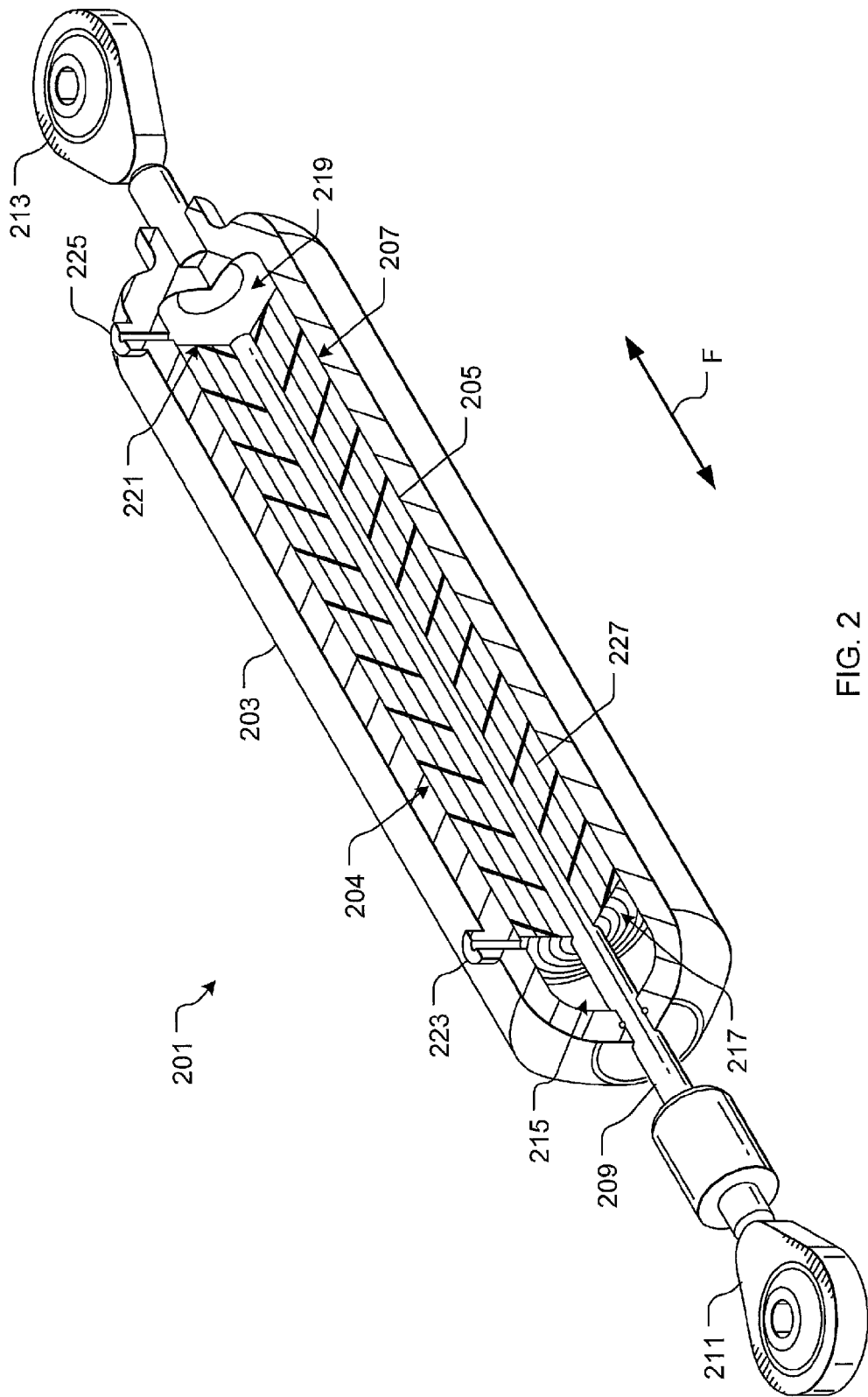
FIG. 2 is a perspective view of a damper of FIG. 1.

FIG. 2 depicts a partial cross-sectional perspective view of a damper 201 of damper system 109. Damper 201 comprises a housing 203 having a cavity 204 with an elastomeric material 205 disposed therein. In the contemplated embodiment, elastomeric material 205 fixedly attaches to an inner surface 207 of housing 203, thus preventing sliding movement of the elastomeric material relative to the inner surface during use.

Elastomeric material 205 receives a rod 209 that in turn attaches to a rod connector 211. A second rod connector 213 is shown rigidly attached to the opposing end of housing 203. In the contemplated embodiment, the rod connectors couple to one or more devices operably associated with rotor system 105, for example, the swashplate and/or yoke. During operation, forces "F", as depicted with an arrow, are exerted on damper 201, which in turn are dampened via the elastomeric material 205 disposed within housing 203.

One of the unique features believed characteristic of damper 201 is utilizing at least one chamber associated with elastomeric material 205 for adjusting the spring rate. In the exemplary embodiment, two chambers are utilized: a first chamber 215 formed by inner surface 207 and a first end 217 of elastomeric material 205; and, a second opposing chamber 219 formed by inner surface 207 and a second end 221 of elastomeric material 205. The exemplary embodiment utilizes two chambers; however, it will be appreciated that alternative embodiments could use more or less chambers for regulating the spring rate in accordance with the features discussed herein.

In gas/fluid communication with first chamber 215 is a first port 223, and a second port 225 in gas/fluid communication with second chamber 219. The ports pass through the thickness of housing 203 and provide attachment means for conduits in gas/fluid communication with a reservoir. During operation, either gas or fluid is channeled from the reservoir and passes through the ports and thereafter to the chambers. The quantity of gas/fluid entering the chamber changes the pressure therein, which in turn is exerted against the elastomeric material, thereby restricting movement of the movement elastomeric material. This process allows for real time adjustment of the damper spring rate.

In the contemplated embodiment, gas is utilized to operate the damper system; however, alternative embodiments could utilize incompressible fluids and the reservoirs would not reach full capacity else hydraulic lock could occur.

One or more optional shims 227, preferably composed of a metallic material, are disposed with elastomeric material 205 and are utilized to increasing rigidity of the elastomeric material along with other desired features.

Figure 3:
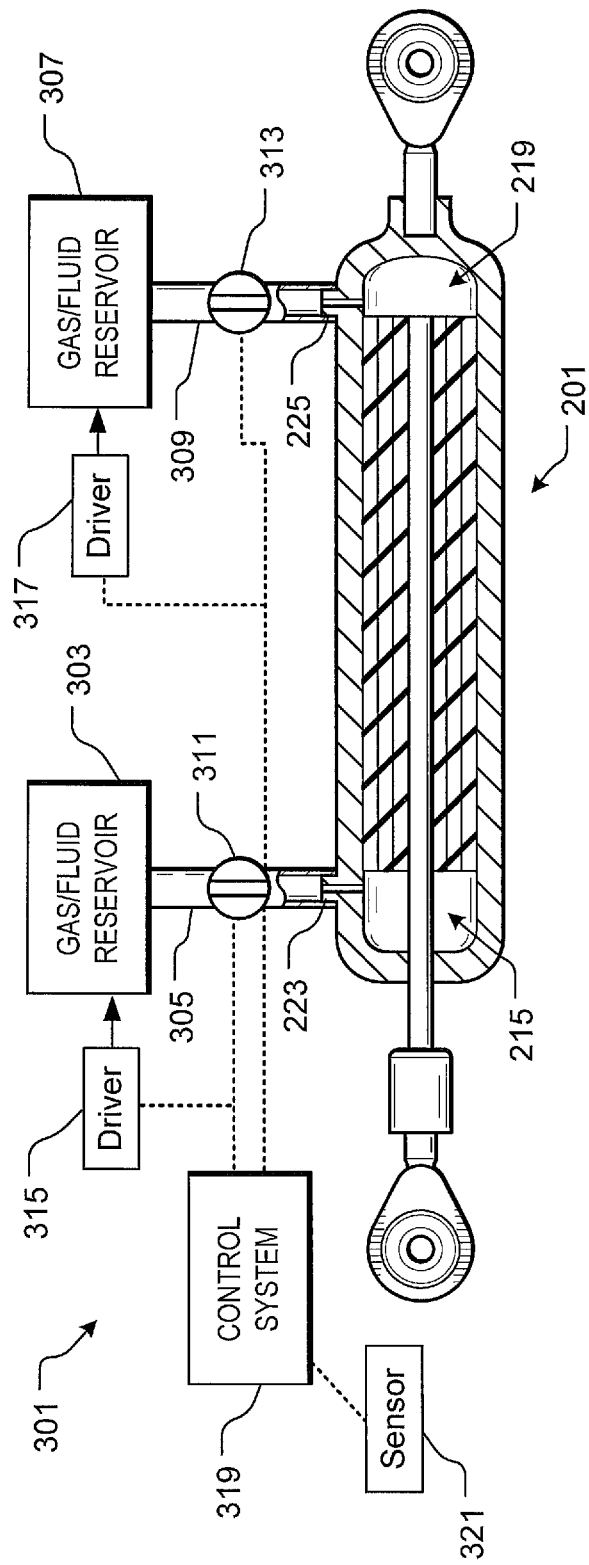
FIG. 3 is a cross-sectional side view a damper system of FIG. 1.
Figure 4:
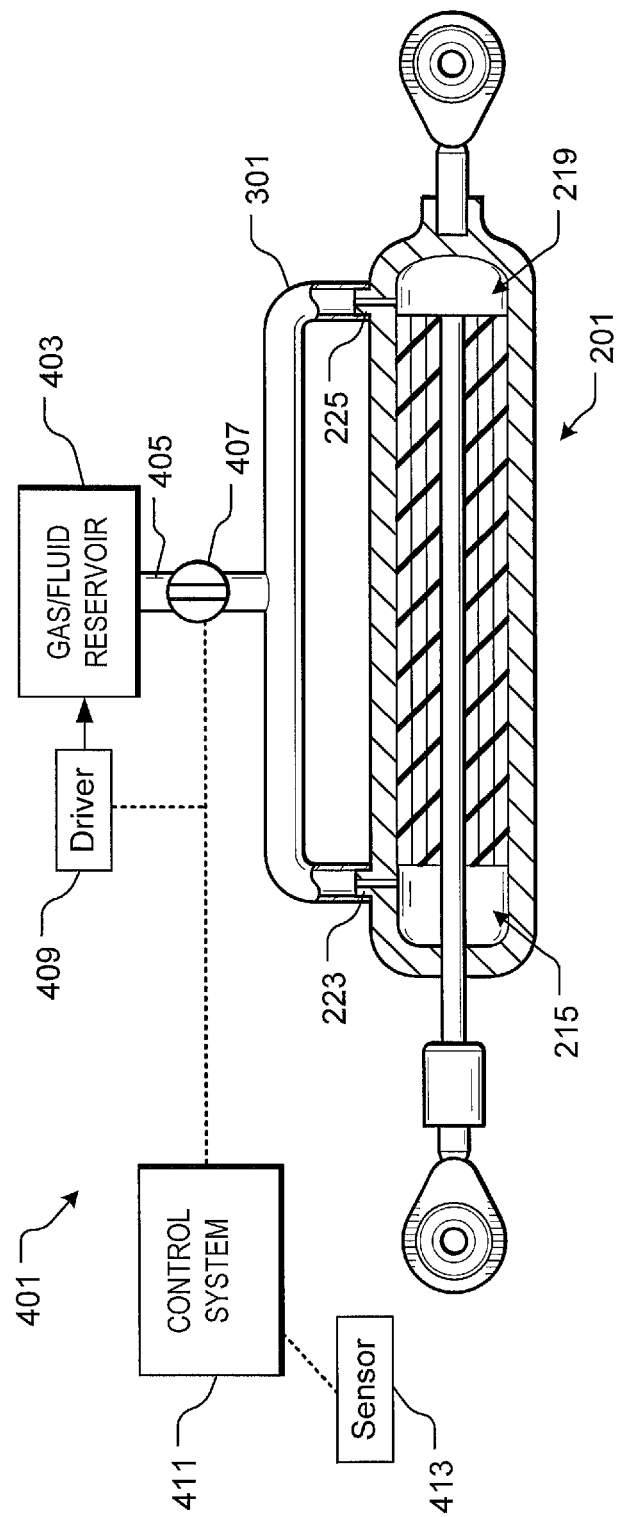
FIG. 4 is an alternative embodiment of the damper system of FIG. 3.

FIGS. 3 and 4 depict side views of two different embodiments of damper system 109, which are substantially similar in form and function to each other, and share one or more of the features discussed herein.

FIG. 3 depicts a side view of damper system 301 operably associated with damper 201. System 301 includes two gas/fluid reservoirs: a first reservoir 303 in communication with chamber 215 via a conduit 305; and, a second reservoir 307 in communication with chamber 219 via a conduit 309. In the exemplary embodiment, two reservoirs are utilized to provide the same or different gas/fluid pressures within the chambers. It will also be appreciated that the system is adapted to create both negative and positive pressures in either chamber, all depending on the desired use.

In gas/fluid communication with conduits 305 and 309 are respective valves 311 and 313 configured to regulate the flow of gas/fluid channeled to the chambers.

A first driver 315 is operably associated with first reservoir 303, and likewise, a second driver 317 is operably associated with second reservoir 307. Both drivers 315 and 317 are configured to drive the gas/fluid carried within the reservoir to the chambers. In the preferred embodiment, the drivers are pneumatic systems; however, other driver systems such as a gear system are also contemplated in the alternative embodiments.

System 301 further comprises a control system 319 operably associated with the gas/fluid reservoirs and valves, as depicted with dashed lines. Control system 319 monitors the spring rate of damper 201 via a sensor 321 and thereafter regulates the spring rate by adjusting the drivers and/or valves such that a desired spring rate is achieved. Thus, system 301 is capable of obtaining a desired spring rate in real time as flight conditions or aircraft performance change.

In the contemplated embodiment, control system 319 is autonomously controlled; however, alternative embodiments could include a control system that is manually controlled by the operator.

It will be appreciated that alternative embodiments could also solely utilize the drivers to regulate the gas/fluid pressure within the chambers. These embodiments would eliminate the need for valves. It is also contemplated utilizing a single driver to regulate both reservoirs, thereby eliminating redundancy.

FIG. 4 is a cross-sectional side view of damper system 401. Damper system 401 is substantially similar in form and function to system 301. In this embodiment, a single gas/fluid reservoir is in communication with both chambers, and it is contemplated having the same pressure in both chambers. The exemplary embodiment also allows for both chambers to be in gas/fluid communication with each other.

System 401 includes a gas/fluid reservoir 403 in communication with both chambers 215 and 219 via a conduit 405. In gas/fluid communication with conduit 405 is a valve 407 configured to regulate the flow of gas/fluid from the reservoir to the chambers. A driver 409 is operably associated with reservoir 403 for driving the gas/fluid carried within the reservoir to the chambers. In the preferred embodiment, the drivers are pneumatic systems; however, other driver systems such as a gear system are also contemplated in the alternative embodiments.

System 401 further comprises a control system 411 operably associated with the gas/fluid reservoir and valve, as depicted with dashed lines. In particular, control system 411 monitors the spring rate of damper 201 via a sensor 413 and thereafter adjusts the drivers and valves such that a desired pressure within the chambers is achieved to adjust the spring rate. Thus, system 401 is capable of obtaining a desired spring rate in real time as flight conditions change.

Alternative embodiments could also include a single gas/fluid reservoir in communication with both chambers, but configured such that different pressures are created in each chamber.

Although shown operably associated with two chambers, it will be appreciated that the features of systems 301 and 401 could easily be utilized with a damper having a single chamber regulated in a similar manner discussed herein.

Although particular step sequences of a method to change the spring rate are shown, described, and claimed, it should be understood that steps may be performed in any order, separated or combined unless otherwise indicated and will still benefit from the present disclosure.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A damper system, comprising:
   a damper, having:
      a housing having an inner surface that forms a cavity;
      an elastomeric material disposed within the cavity and attached at an outer surface to the inner surface of the housing, the elastomeric material being configured to receive an attachment rod end;

a first chamber formed by a first end of the elastomeric material and the inner surface of the housing, the first chamber being configured to restrict movement of the elastomeric material by regulating the pressure therein; and a first port in gaseous communication with the first chamber, the first port being configured to extend through a thickness of the housing;

an external gas reservoir in gaseous communication with the first chamber via the first port; and a control system operably associated with the damper and the external reservoir, the control system being configured to regulate the pressure in the first chamber;

wherein restricting movement of the elastomeric material changes a spring rate of the damper.

2. The damper system of claim 1, wherein pressure from a gas from the external gas reservoir enters into the first chamber to restrict movement of the elastomeric material that in turn changes the spring rate of the damper.

3. The damper system of claim 2, further comprising:
a valve;
wherein the control system is operably associated with the valve;
wherein the control system regulates the amount of gas received within the first chamber via the valve.

4. The damper system of claim 1, the damper further comprising:

a second chamber formed by a second opposing end of the elastomeric material and the inner surface of the housing, the second chamber being configured to restrict movement of the elastomeric material by regulating the pressure therein.

5. The damper system of claim 4, wherein the first chamber is in communication with the second chamber.

6. The damper system of claim 4, further comprising:
a second port in communication with the second chamber; and
a second reservoir in communication with the second port.

7. The damper system of claim 6, wherein the second reservoir is a gas reservoir in gaseous communication with the first chamber via the second port; and wherein pressure from a gas from the second reservoir enters into the second chamber to restrict movement of the elastomeric material that in turn changes the spring rate of the damper.

8. The damper system of claim 4, further comprising:
wherein the external gas reservoir is in gaseous communication with both the first and the second chamber;
wherein regulating the amount of gas in each the first chamber and second chamber changes the spring rate of the damper.

9. The damper system of claim 1, further comprising:
a plurality of longitudinal shims disposed within the elastomeric material.

* * * * *